3,277,123
16β-LOWER ALKYLTHIO-17β-HYDROXY-ESTREN-3-ONE AND PRODUCTION THEREOF

Norio Tokutake, Hyogo Prefecture, Japan, assignor to Shionogi & Co., Ltd., Fukushima-ku, Osaka, Japan
No Drawing. Filed Mar. 1, 1963, Ser. No. 262,211
Claims priority, application Japan, Mar. 10, 1962, 37/9,500
6 Claims. (Cl. 260—397.4)

The present invention relates to 16β-lower alkylthio-17β-hydroxy-estren-3-one and production thereof.

The said 16β-lower alkylthio-17β-hydroxy-estren-3-one is represented by the formula:

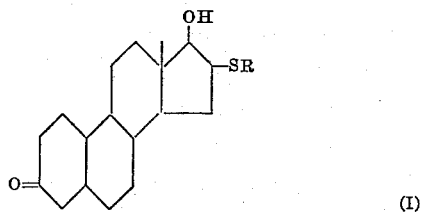

(I)

wherein R is a lower alkyl group (e.g. methyl, ethyl, propyl, butyl) and a double bond exists between 4- and 5-positions or between 5- and 10-positions. This compound (I) possesses a variety of physiological activities such as uterotropic activity, pituitary gonadotrophin inhibiting activity and deciduomatogenic activity. Accordingly, it is useful as an artificial hormonic substance.

The 16β-lower alkylthio-17β-hydroxy-estren-3-one (I) is prepared by treating 16β-lower alkylthio-1,4-dihydro-3,17β-estradiol 3-lower alkyl ether with an acid (e.g. hydrochloric acid, sulfuric acid, nitric acid, acetic acid, oxalic acid).

The starting material, 16β-lower alkylthio-1,4-dihydro-3,17β-estradiol 3-lower alkyl ether, is represented by the formula:

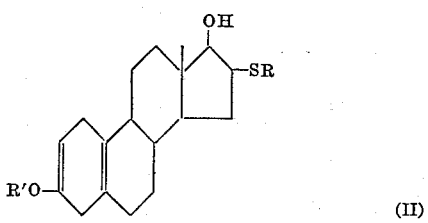

(II)

wherein R has the same significance as designated above and R' is a lower alkyl group (e.g. methyl, ethyl, propyl, butyl) and can be prepared from a known steroid, 16α-bromoestrone 3-lower alkyl ether [Johnson et al.: J. Am. Chem. Soc., vol. 79, p. 2005 (1959)], according to the following scheme:

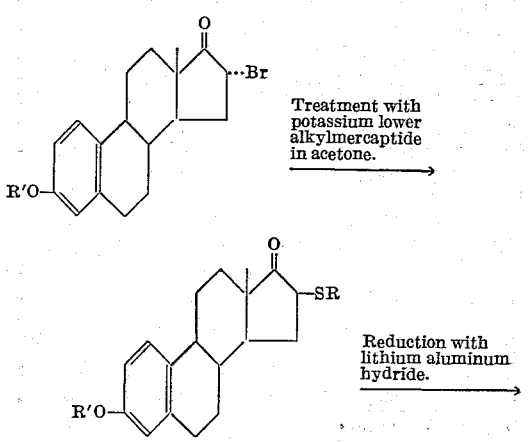

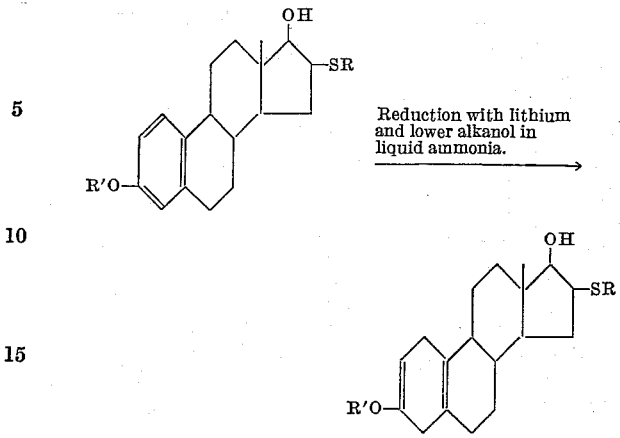

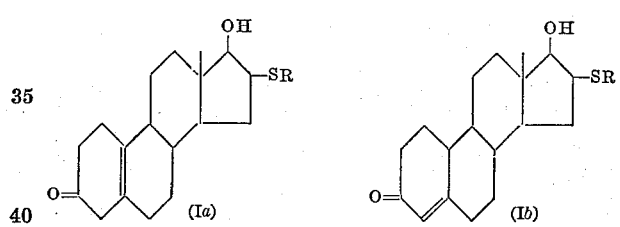

wherein R and R' each has the same significance as designated above.

The reaction readily proceeds by treating the starting compound (II) with an acid in a hydrous medium at a temperature from room temperature (15 to 30° C.) to reflux temperature. There is produced either 16β-lower alkylthio-17β-hydroxy-5(10)-estren-3-one or 16β-lower alkylthio-17β-hydroxy-4-estren-3-one depending on the reaction conditions such as the kind of the employed acid and the reaction temperature, each of the said isomers being represented by the formula, respectively:

(Ia)           (Ib)

wherein R has the same significance as designated above. Generally speaking, the execution of the reaction under milder reaction conditions, i.e. the treatment of the starting compound (II) with a weak acid or a dilute strong acid at a lower temperature for a relatively short time, may afford the $\Delta^{5(10)}$ compound (Ia) as a main product. Under any other stronger reaction conditions such as the use of a strong acid, a higher temperature and/or a longer reaction time, there is produced the $\Delta^4$ compound (Ib). As the $\Delta^{5(10)}$ compound (Ia) is readily isomerized to the $\Delta^4$ compound (Ib) by subjecting the former to the treatment with an acid under the said stronger reaction conditions, the former may be considered as an intermediate to the latter.

The thus produced 16β-lower alkylthio-17β-hydroxy-estren-3-one (I) may be, if necessary, acylated on the 17β-hydroxyl group according to a per se conventional procedure. For instance, the 16β-lower alkylthio-17β-hydroxy-estren-3-one (I) is treated with a lower alkanoic anhydride (e.g. acetic anhydride, propionic anhydride) and an organic base (e.g. pyridine, picoline) at room temperature (15 to 30° C.) or while refluxing to give the 17β-lower alkanoate.

The 16β-lower alkylthio-17β-hydroxy-estern-3-one, i.e. 16β-lower alkylthio-17β-hydroxy-5(10)-estren-3-one (Ia) and 16β-lower alkylthio-17β-hydroxy-4-estren-3-one (Ib), and the acylate thereof possess a variety of physiological activities as stated above. For instance, 16β-ethylthio-17β-hydroxy-5(10)-estren-3-one produced marked inhibition of gonadotrophin secretion at the dosage up to 10 mg. without showing androgenic response, when administered orally or subcutaneously to mice. This compound also produced complete block of decidual growth induced by subcutaneous administration of 3.6 mg. of progesterone, when intra-uterine injection of the same, 0.2 mg. per horn, was carried out on mice. The same compound also enhanced the action of estradiol administered simultaneously and showed uterotropic activity by itself in the test using mice. Further, for example, 16β-ethylthio-17β-hydroxy-4-estren-3-one produced significant inhibition of gonadotrophin secretion at the dosage up to 10 mg. while showing androgenic response, when orally or subcutaneously administered to mice. Although this compound did not inhibit the action of estradiol administered simultaneously, it produced uterotropic activity by itself in the test using mice. Thus, these products are useful as artificial hormonic substances.

The following examples set forth the presently-preferred embodiments of the present invention. In these examples, the abbreviations are intended to have conventional meanings: e.g., g., gram(s); mg., milligram(s); ml., millilitre(s); ° C., degrees centigrade.

Example 1

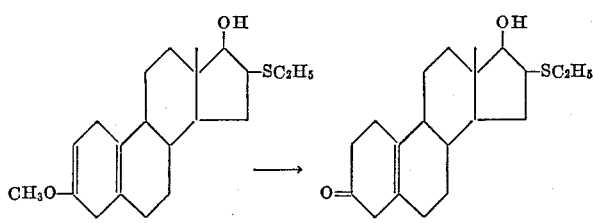

To a solution of 16β-ethylthio-1,4-dihydro-3,17β-estradiol 3-methyl ether (100 mg.) in methanol (27 ml.), there is added 5% hydrochloric acid (3 ml.), and the resultant solution is allowed to stand at room temperature (15 to 30° C.) for 1 hour. The reaction mixture is condensed to a half volume by evaporating methanol at a temperature lower than 30° C. under reduced pressure. Water is added to the condensate. The precipitated crystals are collected by filtration and recrystallized from ethyl acetate to give 16β-ethylthio-17β-hydroxy-5(10)-estren-3-one (75 mg.) as white plates melting at 112.5 to 113.5° C. $[\alpha]_D^{24}$ +126.9° (CHCl$_3$).

$\lambda_{max.}^{C_2H_5OH}$ 280,285 m$\mu$ ($\epsilon$: 70). $\nu_{max.}^{CCl_4}$ 1728, 1684 cm.$^{-1}$ Analysis.—Calcd. for C$_{20}$H$_{30}$O$_2$S: C, 71.84; H, 9.04; S, 9.59. Found: C, 71.67; H, 8.97; S, 9.52.

Example 2

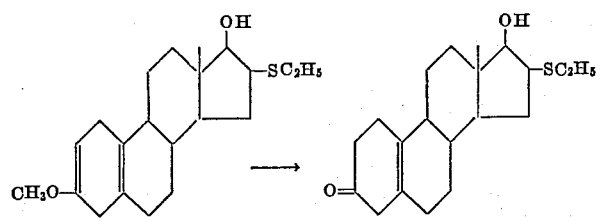

To a solution of 16β-ethylthio-1,4-dihydro-3,17β-estradiol 3-methyl ether (100 mg.) in methanol (30 ml.), there is added a solution of oxalic acid dihydrate (460 mg.) in water (6 ml.), and the resultant solution is allowed to stand at room temperature (15 to 30° C.) for 1 hour. The reaction mixture is shaken with ether. The ether extract is washed with saturated aqueous sodium bicarbonate and water in turn, dried and evaporated. The residue is crystallized from ethyl acetate to give 16β-ethylthio-17β-hydroxy-5(10)-estren-3-one (83 mg.) as white plates melting at 112.5 to 113.5° C.

Example 3

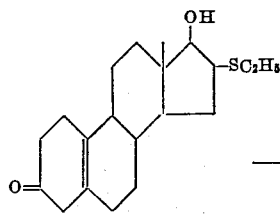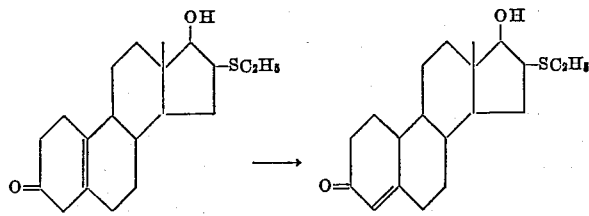

To a solution of 16β-ethylthio-17β-hydroxy-5(10)-estren-3-one (90 mg.) in methanol (16 ml.), there is added 10% hydrochloric acid (4 ml.), and the resultant solution is heated on a steam bath for 10 minutes. After evaporation of methanol under reduced pressure, the condensate is shaken with ether. The ether extract is washed with saturated aqueous sodium bicarbonate and aqueous sodium chloride in order, dried and evaporated. The pale yellowish residue (78 mg.) is chromatographed on alumina and eluted with a mixture of petroleum ether and chloroform (6:4). The eluate is crystallized from ether to give 16β-ethylthio-17β-hydroxy-4-estren-3-one (60 mg.) as white plates melting at 113 to 114° C. $[\alpha]_D^{21}$ −8.2° (CHCl$_3$).

$\lambda_{max.}^{C_2H_5OH}$ 240 m$\mu$ ($\epsilon$: 17,600); 310 312 m$\mu$ ($\epsilon$: 351).

$\nu_{max.}^{CHCl_3}$ 1663, 1618 cm.$^{-1}$

Analysis.—Calcd. for C$_{20}$H$_{30}$O$_2$S: C, 71.84; H, 9.04; S, 9.59. Found: C, 71.88; H, 9.12; S, 9.36.

Example 4

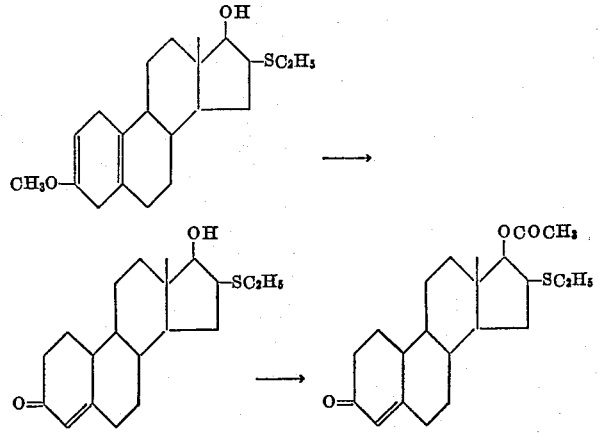

To a solution of 16β-ethylthio-1,4-dihydro-3,17β-estradiol 3-methyl ether (100 mg.) in methanol (12 ml.), there is added 5% hydrochloric acid (8 ml.), and the resultant solution is heated on a steam bath for 10 minutes. After evaporation of methanol under reduced pressure, the condensate is shaken with ether. The ether extract is washed with saturated aqueous sodium bicarbonate and aqueous sodium chloride in order, dried and evaporated. The pale yellowish residue is chromatographed on alumina and eluted with a mixture of petroleum ether and chloroform (6:4). The eluate is crystallized from ether to give 16β-ethylthio-17β-hydroxy-4-estren-3-one (90 mg.) as white plates melting at 113 to 114° C.

A solution of the above-obtained 16β-ethylthio-17β-hydroxy-4-estren-3-one (90 mg.) in pyridine (1 ml.) and acetic anhydride (1 ml.) is allowed to stand at room temperature (15 to 30° C.) overnight. The reaction mixture is condensed under reduced pressure. The residue is crystallized from a mixture of acetone and hexane to give 16β-ethylthio-17β-hydroxy-4-estren-3-one 17-actate (71 mg.) as colorless prisms melting at 152.5 to 153.5° C. $[\alpha]_D^{24}$ +57.5° (CHCl$_3$).

$\lambda_{max.}^{C_2H_5OH}$ 240.5 m$\mu$ ($\epsilon$: 19,000). $\nu_{max.}^{CHCl_3}$ 1730, 1668, 1622 cm.$^{-1}$.

*Analysis.*—Calcd. for $C_{22}H_{32}O_3S$: C, 70.17; H, 8.57; S, 8.52. Found: C, 69.95; H, 8.61; S, 8.76.

What is claimed is:
1. A compound of the formula

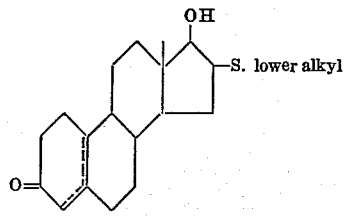

wherein there is a double bond in one of the positions represented by broken lines.

2. 16β - lower alkylthio - 17β-hydroxy-5(10)-estren-3-one.
3. 16β-ethylthio-17β-hydroxy-5(10)-estren-3-one.
4. 16β-lower alkylthio-17β-hydroxy-4-estren-3-one.
5. 16β-ethylthio-17β-hydroxy-4-estren-3-one.
6. 16β - ethylthio - 17β - hydroxy - 4 - estren - 3-one 17-acetate.

References Cited by the Examiner
UNITED STATES PATENTS
3,170,920  2/1965  Komeno _____ 260—239.55

LEWIS GOTTS, *Primary Examiner.*